United States Patent [19]

Wilson

[11] Patent Number: 5,248,172
[45] Date of Patent: Sep. 28, 1993

[54] ADJUSTABLE FLUID TRANSFER APPARATUS

[75] Inventor: Walter L. Wilson, Alexandria, Va.

[73] Assignee: United States of America as represented by the Secretary of the Army, Washington, D.C.

[21] Appl. No.: 860,969

[22] Filed: Mar. 31, 1992

[51] Int. Cl.⁵ .............................................. F16L 27/12
[52] U.S. Cl. .................................. 285/165; 285/298; 285/302; 239/439; 239/436
[58] Field of Search .............. 281/298, 302, 303, 163, 281/165, 32; 239/280, 281, 439, 436, 440, 438, 587.1; 222/514, 513

[56] References Cited

U.S. PATENT DOCUMENTS

| 1,769,944 | 7/1930 | Crisp | 239/281 |
|---|---|---|---|
| 2,776,168 | 1/1957 | Schweda | 285/165 |
| 2,944,743 | 7/1960 | Kachergis | 239/438 |
| 3,466,062 | 9/1969 | Deplante | 285/165 |
| 4,013,225 | 3/1977 | Davis | 239/281 |
| 4,071,195 | 1/1978 | Kuhns et al. | 239/436 |
| 4,944,460 | 7/1990 | Steingass | 239/439 |

FOREIGN PATENT DOCUMENTS 510840 12/1920 France .................. 285/165

Primary Examiner—Eric K. Nicholson

[57] ABSTRACT

An adjustable fluid transfer apparatus for use in transferring a fluid which includes a transfer conduit assembly coupled to a connector conduit assembly. The connector conduit assembly includes a flare nut and sleeve for releasable engagement to a liquid supply outlet. The transfer conduit assembly is adjustable in length by use of a spring loaded fitting that allows for an outer transfer conduit along with the fitting to be in axial slidable engagement around an inner transfer conduit.

4 Claims, 3 Drawing Sheets

ADJUSTABLE FLUID TRANSFER APPARATUS

BACKGROUND OF THE INVENTION

1. Field of the Invention

The field of the invention disclosed herein is directed to fluid transfer and particularly to adjustable fluid transfer apparatus.

2. Description of Related Prior Art

There has been a problem encountered in the prior art with respect to fluid transfer. Many fluids are transferred and stored in bulk for many different reasons including cost, efficiency, and danger of handling such fluids in small quantities. Such examples include cryogenic fluids, gasoline, and natural gas to name a few. Usually such transfer from a bulk source is not easily accomplished, since the outlet is not conveniently placed and may lead to unwanted occurrences of spillage or explosion.

With respect to the specific embodiment described herein the following problem in the prior art was encountered.

Up to now, arbitrary lengths of half-inch copper tubing were bent into L-shaped sections and attached to a main fill tank of liquid nitrogen via a flare nut. The fixed height of the output copper tube was exclusively determined by its length and where the 90° elbow was located and could not be readjusted after attachment.

This situation has resulted in much frustration when attempts were made to fill a container whose size did not match the height of the transfer tube line. Usually, objects had to be placed under the interim container to bring it up to the proper height. These inadequate and unsatisfactory arrangements invariably lead to spillage and waste of liquid nitrogen and occasionally even result in accidental frostbite injuries when last minute attempts are made to realign the extremely cold ($-321°$ F.) transfer line by hand to prevent spills. Finally, another problem occurred during the initial attachment of the transfer line to the main tank. A special-purpose wrench was generally needed to properly tighten the flare nut.

The present invention overcomes the problem of the prior art by providing an apparatus which allows for the transfer of fluids in a safe, easy, and convenient manner without the use of any special proper tools.

SUMMARY OF THE INVENTION

The invention disclosed herein is directed to an adjustable fluid transfer apparatus for use in transferring a fluid. A transfer conduit assembly coupled to a connector conduit assembly allow for transfer of a fluid from a fluid supply outlet which a connector means is in releasable connection thereto. The assemblies are adjustable to vary the effective length of each assembly. The transfer conduit assembly includes a coupling means inserted into an outer adjustable transfer conduit, with both in axial slidable engagement around an inner transfer conduit. The coupling means is a spring loaded fitting that includes a clamp to hold the other adjustable transfer conduit and a flat spring which biases the spring loaded fitting against the inner transfer conduit. Copper tubes are the preferred embodiment for the conduits.

The primary objective of this invention is to provide an apparatus which allows for the transfer of a fluid in a safe, easy, and convenient manner without the use of any special purpose tools.

BRIEF DESCRIPTION OF THE DRAWINGS

A full and complete understanding of the invention can be obtained from the following detailed description of the invention when read in conjunction with the annexed drawing in which.

PREFERRED EMBODIMENTS

Figure 1:
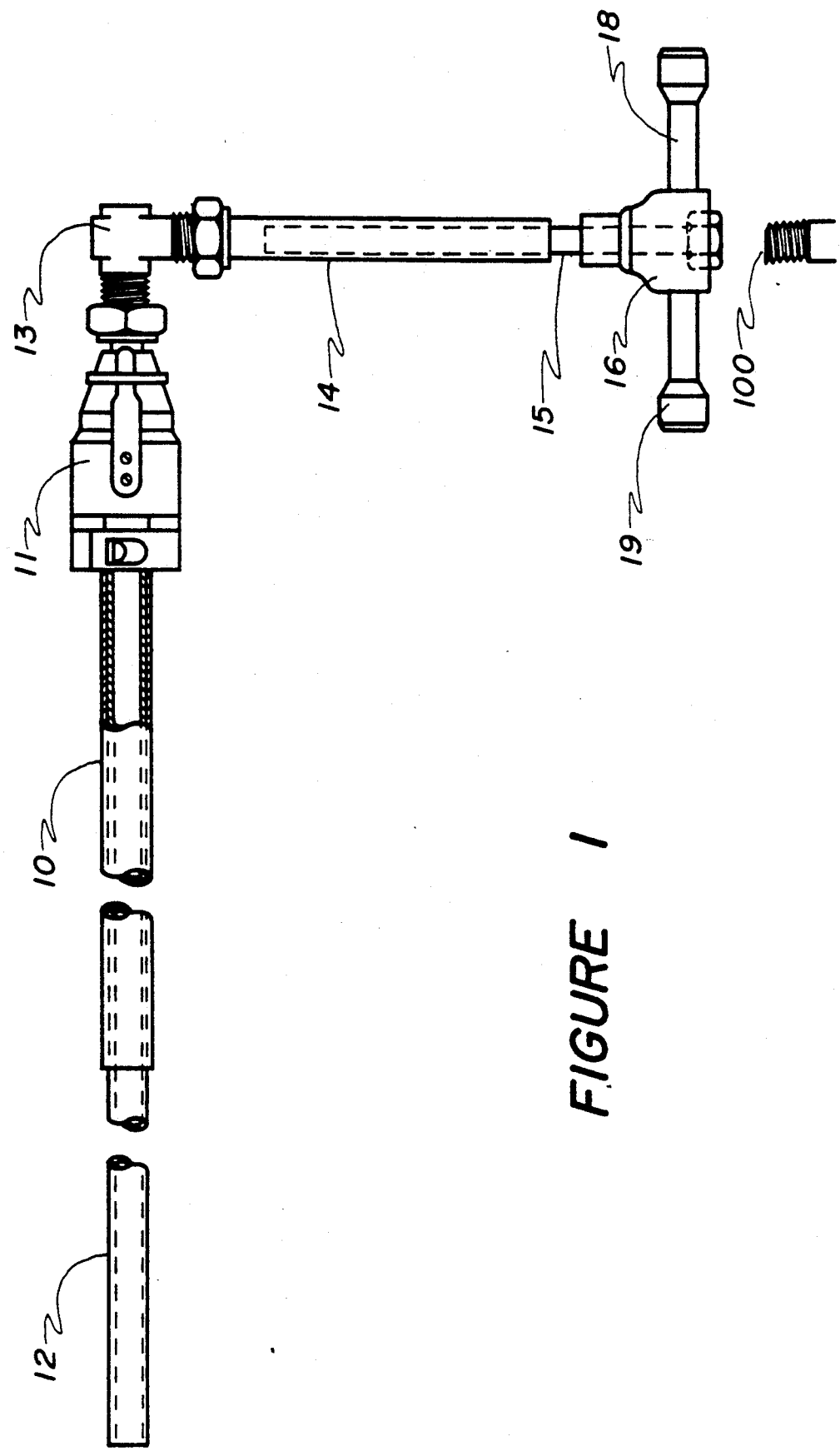
FIG. 1 shows a side view of the adjustable fluid transfer apparatus.

FIG. 1 depicts the adjustable fluid transfer apparatus of the present invention and includes a transfer conduit assembly, connector conduit assembly, two coupling means, and a connector means.

The transfer conduit assembly includes outer adjustable transfer conduit 10 with one end of which is shown as axially inserted into a spring loaded fitting 11 that functions as a coupling means. Outer adjustable transfer conduit 10 and spring loaded fitting 11 are both in axial slidable engagement around an inner transfer conduit 12. By adjusting the position where spring loaded fitting 11 is set along inner transfer conduit 12, the effective length of the transfer conduit assembly may be thus adjusted. An elbow fitting 13 couples the end of the inner transfer tube 12 to a connector conduit assembly also shown in FIG. 1.

The connector conduit assembly includes an outer connector conduit 14 attached to elbow fitting 13. Inner adjustable connector conduit 15 is axially slidable within outer connector conduit 15 such that the effective length of the connector conduit assembly may also be adjusted. While an adjustable connector conduit assembly is disclosed, it is understood that the invention is not limited to such. The connector conduit assembly can also consist in an alternate embodiment as a single fixed conduit of desired length. On the other end of inner connector conduit 15 is a connector means shown which provide releasable connection to fluid supply outlet 100. The connector means shown is the preferred embodiment includes a flare nut sleeve 16 and flare nut 17 and together form a threadable engagement means to releasably attach the apparatus to a fluid supply outlet. Arm elements 18 are welded on flare nut sleeve 16 with end caps 19 to provide hand torque enhancement for attachment to a fluid supply without the use of special tools. It is understood that the invention is not limited to the specific embodiment disclosed for the connector means. Any suitable connector means which provides releasable attachment may be used, and may vary depending on operating conditions, the type of fluid utilized, and the supply outlet.

Figure 2:
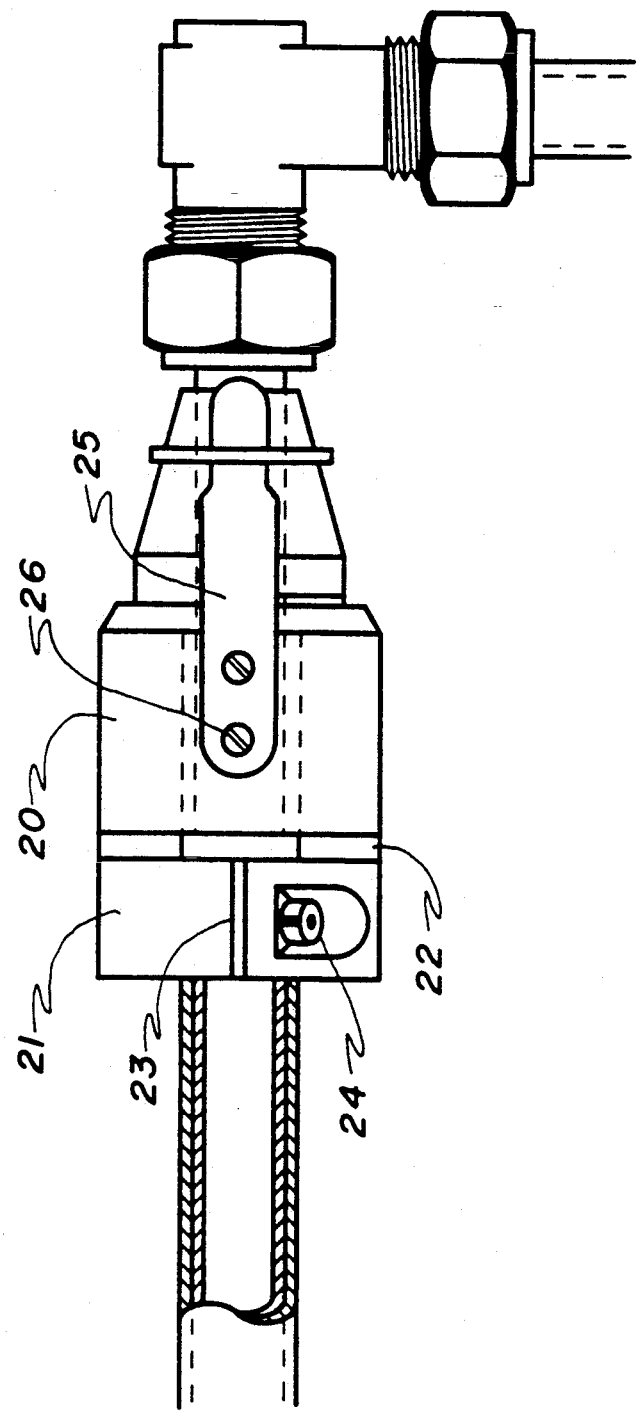
FIG. 2 shows a expanded side of the spring loaded fitting.
Figure 3:
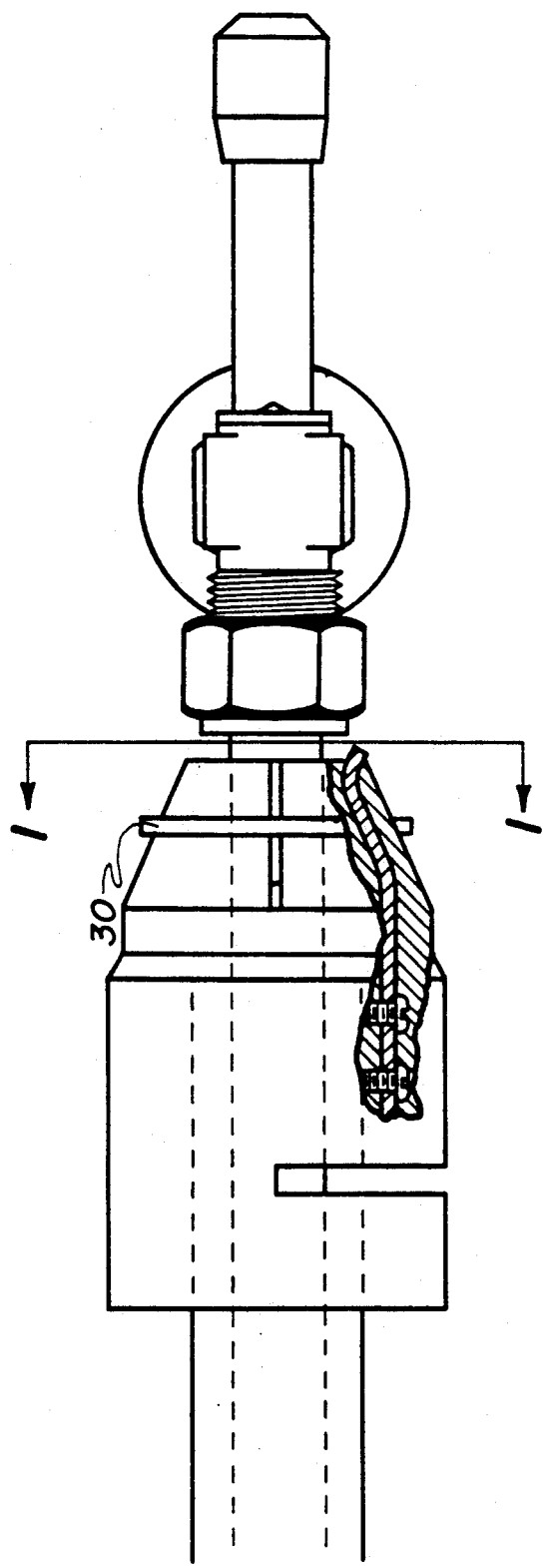
FIG. 3 shows a top view with spring shown rotated 90° with respect to FIG. 2.
Figure 4:
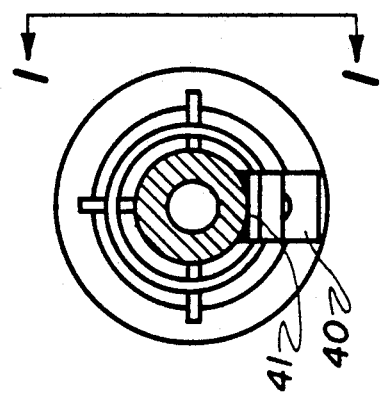
FIG. 4 shows a cut-a-way view along line A-A$^1$ of FIG. 3

FIGS. 2, 3, and 4 depict details of the spring loaded fitting 11. In FIG. 2, housing 20 includes a clamp body 21 which is integral with housing 20. Clamp body 21 is defined by one end which outer adjustable transfer conduit 10 of FIG. 1 is inserted, and other end by clamp notch 22. Clamp slit 23 is formed radially inward from body clamp 21 and clamp screw 24 releasably engages clamp slit 23 so as to frictionally hold outer adjustable transfer conduit 10 in place. It is understood that the invention is not limited to the specific embodiment disclosed for the spring loaded fitting 11, so that the particular shape of housing 20, or type of releasable engagement means may vary.

Spring loaded fitting 11 of FIG. 1 requires a releasable friction means attached to housing 20 of FIG. 2 so as to frictionally bias against inner transfer conduit 12 of FIG. 1. This allows the spring loaded fitting 11 and outer adjustable transfer conduit 10 to be manually moved to a desired position along inner adjustable transfer tube 12, and once positioned stay in place. The releasable friction means of the preferred embodiment is flat spring 25 which is held in place by screws 26. It is understood that the invention is not limited to the specific releasable friction means disclosed but may be any suitable means which bias against inner transfer conduit 12 of FIG. 1. Flat spring 25 is inset as shown in FIG. 3. A clip spring 30 releasably holds flat spring 25 of FIG. 2 in place.

As shown in FIG. 4, spring 25 of FIG. 2 is inset in a spring loaded fitting notch 40 integral to housing 20 of FIG. 2. FIG. 4 shows spring engagement surface 41 which biases against inner transfer conduit 12 of FIG. 1.

Tubes have been disclosed as the preferred means for fluid transfer by the transfer conduit and connector conduit assemblies. It is understood that the invention is not limited to the specific conduit disclosed. Any type of conduit may be used as long as the function of fluid transfer is achieved. In the preferred embodiment the connector means which connects the transfer conduit assembly and connector conduit assembly is at a fixed 90° orientation and the length of the transfer conduit assembly is adjustable from 6 to 30 inches. It is understood that the invention is not limited to these parameters. The connector means may be such that an adjustable angle may be utilized and a transfer conduit assembly of any desired adjustable range designed.

Operation of the invention in the preferred embodiment is as follows. The operator attaches flare nut 17 to a fluid supply outlet. Flare nut sleeve 16 is hand torqued via arms 18 onto the supply outlet which is turned on and off. Outer connector conduit 14 is adjusted to the desired distance out from the fluid supply outlet. The transfer conduit assembly now points downwards and ends at some arbitrary height above a floor. The operator places a container to be filled next to the fluid supply and adjusts spring loaded fitting 11 to a desired height so that the fluid outlet is inside the container to be filled.

The preferred practice of the invention is for transferring a liquefied gas, more particularly liquid nitrogen from large fill tanks or dewars (which may be 160 liters or more) to interim container of dewars. The present invention is very suited to such transfer since the use of the present invention protects the operator from the dangerous aspects of such liquids. The operator needs only to manipulate the spring loaded fitting 11 after or during filling to adjust the transfer tube assembly length. Since the fitting is preferably made of a non-conductive material, such as nylon, the operator is not harmed by the dangerous effects of extreme cold produced by the liquefied gas. Also the tubes and other connectors of the preferred invention may be made of copper which is resistive to the effects of extreme cold produced by a liquefied gas. The present invention is also very suited for use of hazardous fluids, both gaseous and liquid, which because of their nature would be dangerous to an operator to transfer by a conventional method.

With the apparatus as disclosed, any fluid may be transferred reliably, consistently, and safely, both in a horizontal and vertical directions (or variations thereof) relative to a fluid supply outlet.

Industrial applicability of this invention includes but is not limited to: the fluid storage and fluid transportation industries in such various areas as materials research, biology and food preservation.

This preferred embodiment is not intended to restrict the invention to the precise embodiment or embodiments described.

I claim:

1. An adjustable fluid transfer apparatus for use in transferring a fluid from a fluid supply outlet comprising:
   a connector conduit assembly with two ends for transferring a fluid along a first direction including a connector means coupled to one end of said connector conduit assembly for providing releasable connection to a fluid supply outlet;
   a coupling means with two ends, one end of which is coupled on said other end of said connector conduit assembly whereby fluid transfer connection is achieved between the connector conduit assembly and an inner transfer conduit;
   an inner transfer conduit with one end coupled to said other end of said coupling means for transferring fluid along a second direction;
   an outer adjustable transfer conduit with two ends where one end is coupled to a housing including a releasable fitting means on one end of said housing for engagement of said outer adjustable transfer conduit with said outer adjustable conduit partially inserted within said housing, where the outer adjustable transfer conduit, housing, and releasable fitting means are all in axial slidable engagement around the inner transfer conduit;
   a releasable friction means attached to said housing which bias against said inner transfer conduit whereby fluid may be transferred from a fluid supply outlet in a first and second direction with the capability of adjusting an effective length in at least one of said directions so as to adjust an effective position of a fluid exit.

2. The adjustable fluid transfer apparatus of claim 1, wherein said releasable fitting means further includes:
   a clamp body integral with said housing with first and second ends for engaging the outer adjustable transfer conduit partially inserted with the housing;
   a notch formed radially in said housing to define at least one end of the clamp body;
   a slit in said clamp body approximately parallel to said outer and inner transfer conduits;
   releasable engagement means coupled to said slit to releasably engage said slit, thereby to frictionally hold the outer adjustable transfer conduit in the housing.

3. The adjustable fluid transfer apparatus of claim 1, wherein said releasable frictional means is a flat spring.

4. The adjustable fluid transfer apparatus of claim 1, wherein said connector conduit assembly further includes:
   an inner connector conduit with one end for providing said releasable connection to a fluid supply outlet;
   an outer adjustable connector conduit with two ends where one end is in axial slidable engagement around the inner connector conduit and the other end of the outer adjustable connector conduit is coupled to the first end of the coupling means whereby the effective length of the connector conduit assembly may be adjusted.

* * * * *